Figure 2:
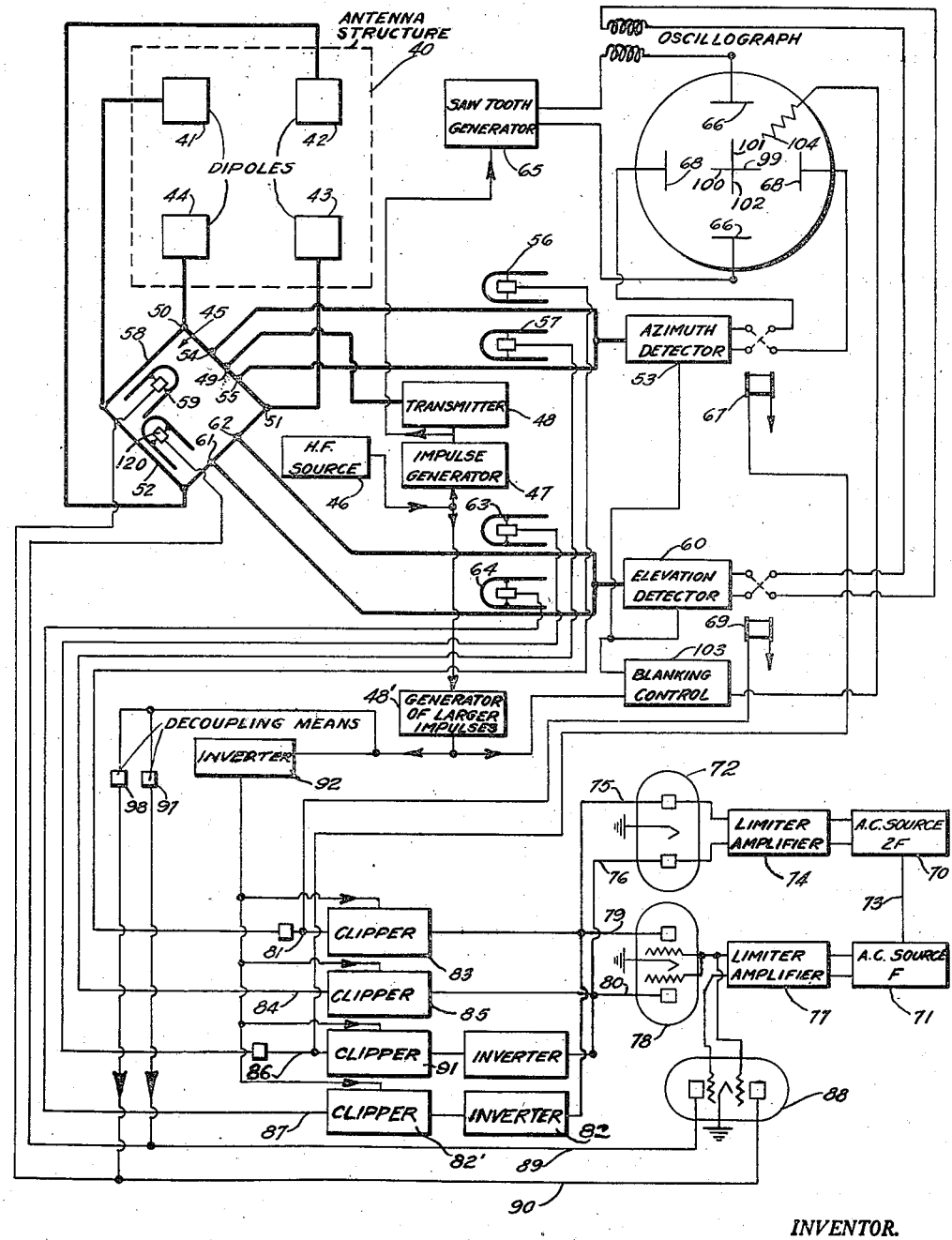

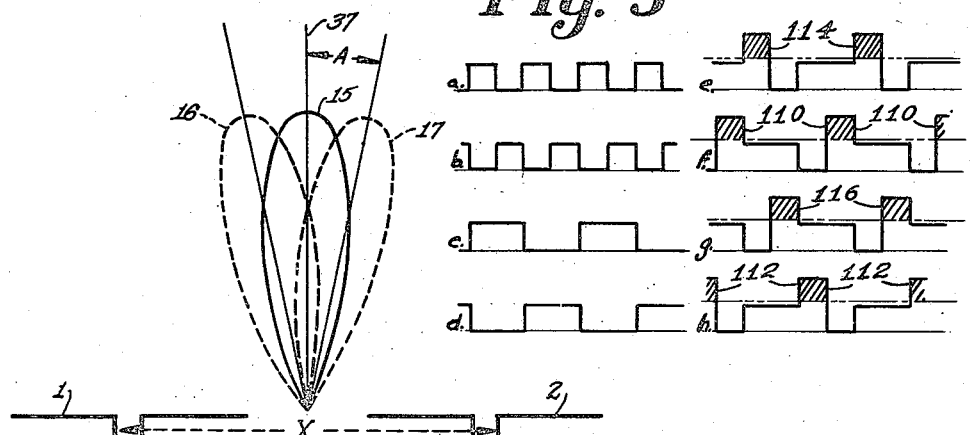
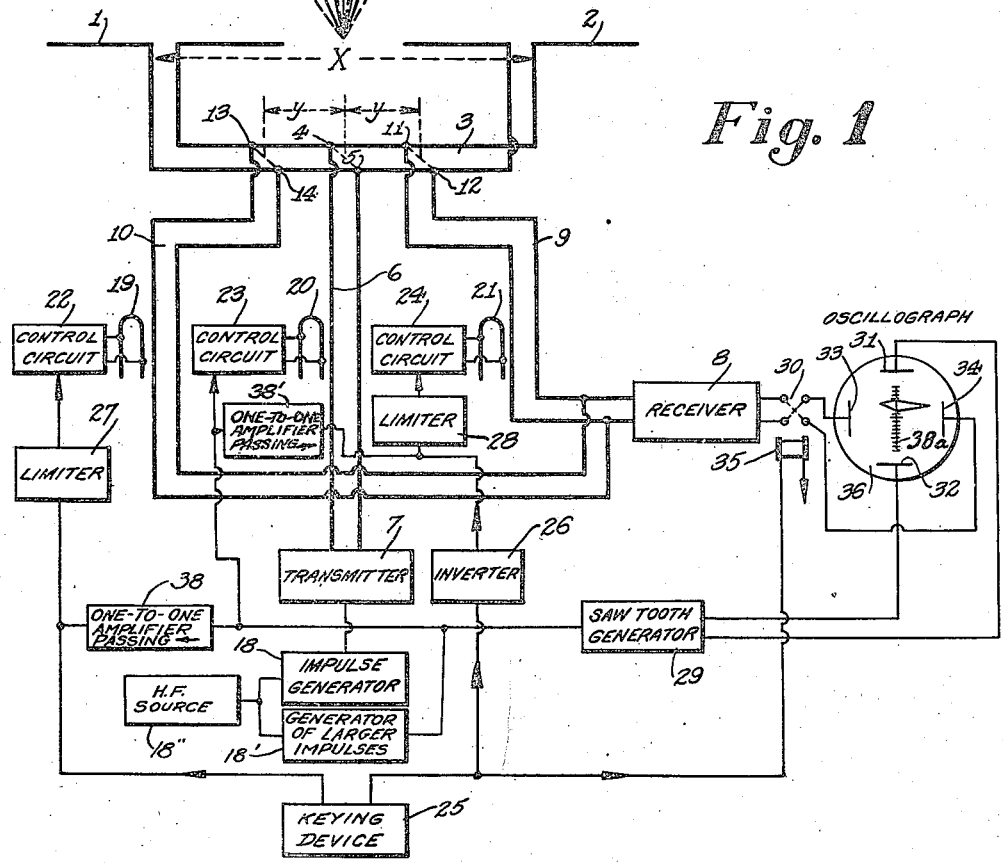

Patented Aug. 5, 1947

2,424,984

UNITED STATES PATENT OFFICE 2,424,984

DISTANCE AND DIRECTION RADIO OBJECT DETECTION

Ross B. Hoffman, East Orange, N. J., assignor to Federal Telephone and Radio Corporation, a corporation of Delaware Application February 14, 1942, Serial No. 430,905

16 Claims. (Cl. 250—1.62)

This invention relates to radio impulse systems for the detection of distant objects and more particularly to such systems for the detection of hostile aircraft by friendly aircraft or seaborne vessels or observation posts.

It is an object of the invention to provide an improved system operated by brief wave trains of U. H. F. waves (hereafter called wave-impulses) for determining the direction and range of an object to be detected.

Another object is to provide in conjunction with such a wave-impulse system a single antenna structure and circuit for obtaining directional indications representing a plurality of distinct directions with respect to the apparatus.

It is also an object to provide an improved-type multi-directional antenna array having increased sensitivity.

A more specific object is to provide an improved circuit arrangement for appropriately coupling elements of a relatively simple antenna structure to apparatus for detecting from received energy the direction of and distance to a radiant-energy-reflecting object within range of the apparatus.

Further objects and various other features of novelty and invention will hereinafter be pointed out or will become apparent to those skilled in the art from a reading of the following description in conjunction with the accompanying drawings in which Figs. 1 and 2 are schematic block diagrams illustrating two embodiments of the invention, and Fig. 3 illustrates graphically certain voltage conditions in the circuit of Fig. 2.

In the embodiment of the invention shown in Fig. 1, the same pair of dipoles 1 and 2 is employed for the transmission and reception of signal impulses. The dipoles 1 and 2 are connected together by transmission line 3, to the midpoint 4—5 of which is connected a further transmission line 6 extending from a transmitter 7. A receiver 8 is connected to the antenna structure 1, 2 over two transmission lines 9, 10 of identical electrical length, the first of which is joined to the transmission line 3 at a point 11—12 spaced a distance to the right of the midpoint 4—5 and the second of which is joined to the transmission line 3 at a point 13—14 spaced the same distance to the left of the midpoint 4—5. It will be readily appreciated that if the transmission line 6 is effective to pass high-frequency currents while transmission lines 9 and 10 are blocked, the two dipoles 1, 2 will be energized in like phase and waves will be transmitted according to a radiation pattern such as 15 (shown in full lines) in which the major axis is normal to the arms of the dipoles. Now, if transmission line 6 be blocked and one of lines 9 and 10 be unblocked, receiver 8 will be connected to both antennas 1 and 2. However, it will be noted that the length of the line connection to one of the antennas will be greater than that to the other by an amount equal to 2y (the distance between points 13—14 and 11—12). Thus, if say, line 10 is the unblocked line, the receiver connection to antenna 2 will be longer by a distance 2y than that to antenna 1. With such a line connection, it will be clear that reception will be of a directional nature veering off the general direction of transmission. The reception may in such case be represented by a lobe 17, shown dotted in Fig. 1. Alternatively, if line 9 is the unblocked line, the antenna connections to receiver 8 may be unbalanced in a sense reversed from those when line 10 is unblocked and a different directional reception pattern may thus be attained. In the drawing, lobe 16 may be illustrative of this alternate pattern. The angle A which the axis of these directional reception patterns each may make with the axis of transmitted energy may be approximately determined from the physical disposition of the radiating elements and their connections. If the distance between elements 1 and 2 be X, and if the transmission lines have substantially the same wave propagation velocity as free space (as in the case of lines whose dielectric is principally air), then it can be shown by simple trigonometry that angle $$A = \sin^{-1}\frac{2y}{X}$$

As stated above, it is contemplated that the invention will be applied to a system of obtaining indications of the distance and direction of distant objects by a concurrent transmission and reception of wave-impulse energy. An impulse generator 18 is therefore provided to feed D. C. impulses for modulating the transmitter 7 to produce the desired wave impulses; and an impulse generator 18', supplying D. C. impulses of the same recurrence frequency but of greater duration than those supplied by generator 18, may be provided for controlling the blocking and unblocking of the transmission lines, 6, 9 and 10 in a manner which will be described later. In the form shown, a common high frequency source 18'' supplies energy for impulse generators 18 and 18', and these generators may thus be accurately synchronized. Since the transmitter impulses are of very short duration and successively recur in relatively short intervals (e. g. 50 to 5000 per second), the use of mechanical devices for opening and closing the transmission lines gives rise to difficulties. It is accordingly considered desirable to employ permanently-coupled transmission lines and to provide electronically controlled means for blocking and unblocking the lines under the control of an impulse generator. A suitable means for effecting this control is disclosed in my copending application, Serial No. 418,671, filed November 12, 1941, Patent No. 2,402,625, granted June 2, 1946, and entitled "Antenna switching devices." In the form shown therein, the control means comprises a relatively short section of transmission line shorted at one end and coupled to the transmission line proper, and a control circuit including an electron discharge device connected to control the resonant and non-resonant condition of the coupled section, thus blocking or unblocking the transmission line as the case may be.

In the arrangement shown in Fig. 1, coupled sections 19, 20, 21, and control circuits 22, 23, 24 are respectively associated with transmission lines 10, 6 and 9. The control circuits 22, 23, and 24 are controlled by impulses from the impulse generator 18' and the circuits 22, 24 associated with the receiver transmission lines 10, 9 are arranged to be operative in a sense inverse to operation of the circuit 23 associated with the transmitter transmission line 6, in such manner that during the transmission of an impulse from generator 18', line 6 is unblocked and the lines 9 and 10 are blocked; and during the intervals between impulses, line 6 is blocked and lines 9 and 10 are unblocked.

In order alternately to render effective or unblocked the receiving transmission lines 9 and 10, so as to obtain alternately the receiving radiation patterns 16 and 17, a keying device 25 may be provided to generate a square wave having a periodicity preferably less than the perodicity of the impulse generators 18 and 18' (e. g. 10 to 60 cycles per second). This wave is applied to the control circuit 22 and 24 and inverter circuit 26 of known construction is inserted in the connection to the control circuit 24 so that the keying device 25 may supply to the control circuit 24 a wave form inverse to that supplied to the control circuit 22. Limiters 27 and 28 of known construction may be inserted in the connections to the control circuits 22 and 24 to ensure that these circuits will not be incorrectly operated when blocking impulses from both impulse generator 18' and the keying device 25 are simultaneously applied to them, as will be clear.

In the form shown, circuits 22, 23 and 24 have one single input each; and receiver blocking impulses from generator 18' are supplied to these inputs as are also the keyed impulses from keyer 25. In order then to prevent keyed impulses of one polarity from interfering with those of another or with the blocking impulses, I prefer to insert appropriate blocking circuits 38 and 38' as shown. As shown, these blocking circuits may comprise one-to-one amplifiers (say of the cathode follower type to preserve polarity relationships).

The pickup from the dipoles 1 and 2 is applied to receiver 8, the output circuit of which may be connected over a reversing switch 30, to the horizontal deflector plates 33, 34 of a cathode ray oscillograph 36. The reversing switch 30 may be actuated by a relay 35 which is energized by the keying device 25 whereby the polarity of the signal potential applied to the deflector plates 33, 34 is reversed synchronously with the change-over from one receiving response pattern to the other. Saw-tooth waves are produced by a saw-tooth generator 29 under control of the impulse generator 18' and applied to the vertical deflector plates 31, 32 of the oscillograph 36.

It will be seen that during the period of each impulse produced by the impulse generator 18', the system is conditioned for transmission and that during the periods between these impulses, the system is conditioned for reception. In the application of the invention to the location of a distant object, reflected impulse waves may be received during the intervals between transmitted impulses; and, due to the operation of the keying device 25, reception will take place alternately according to the response patterns 16 and 17. As already stated, the periodicity of the keying device 25 is preferably less than that of the impulse generator 18 in order that each radiation diagram is effective for the time of several transmitted impulses. The output of the receiver 8 may therefore be utilized to provide an indication of the direction of the reflected waves and thus of the object to be detected on the screen of the oscillograph 36. Since the polarity of the receiver output is reversed by the switch 30 synchronously with the keying of the receiving response patterns, the length of the luminous trace transversely of either side of the central vertical scale of the oscillograph will depend upon the position of the object relative to the datum line 37, along which the two reception patterns 16 and 17 are equal. The dipole structure 1, 2, or the aircraft or other vehicle on which the apparatus is mounted, may then be turned until the traces on each side of the scale 38a are equal, at which time an observer of the indicator apparatus will know that datum line 37 is aimed at the reflecting object.

Since a saw-tooth sweep voltage is applied to the vertical deflector plates 31, 32 of the oscillograph, if the scale 38a be suitably calibrated, the vertical position of the luminous trace may provide an indication of the distance of the object to be detected.

For the sake of simplicity in understanding the basic functioning of the apparatus thus far described, I have indicated transmission line 6 to be complemented with a blocking network including coupled section 20 and control circuit 23. For simpler construction however, it would be possible to eliminate this network merely by appropriately constructing the length of line 6 between transmitter 7 and the junction 4—5. If this length be made such that, when connected to the output circuit of transmitter 7 it will resonate as a line with substantially equal impedance at both ends, it is clear that during intervals between impulses supplied by generator 18', that is, as far as received energy is concerned, line 6 may be substantially unreceptive. As such, line 6 may offer such high impedance to received energy that junction 4—5 will absorb relatively little power, thus permitting substantially all received energy to be conducted to receiver 8 by way of line 9 or 10 as the case may be.

A further embodiment of the invention is illustrated in Fig. 2. This embodiment shows how the invention may be adapted to a still more complex receiving pattern than that demonstrated in Fig. 1. According to this embodiment, a single antenna structure may be employed with a relatively high degree of precision to discriminate the azimuth and elevation of a detected object, that is, reception may be discriminative in two co-ordinate senses.

In the form shown, the single antenna structure 40 comprises four elements 41, 42, 43, 44 which may be disposed as shown at the corners of the parallelogram. The antenna structure 40 may be directive similar for example to the antenna structure disclosed in a copending application of H. Busignies, Serial No. 381,640, filed March 4, 1941. As in the case of Fig. 1, these elements may be dipoles. Each of the antenna elements 41 . . . 44 is preferably connected to a bridge network 45 by appropriate transmission line means of the same effective electrical length in each instance. For reasons that will later be clear, bridge 45 comprises four preferably equal arms which may be transmission lines of an electrical length effectively equal to an integral number of wavelengths at the transmission frequency.

As in the case of the circuit of Fig. 1, a high-frequency source 46 may be employed as a prime source of modulating energy. Source 46 is utilized to synchronize an impulse generator 47 for supplying extremely short impulses for transmission purposes and impulse generator 48' for supplying impulses of the same recurrent pattern but of somewhat greater duration for blocking purposes. Impulse generator 47 thus supplies energy to a transmitter 48 which is connected by a transmission line of appropriate length to the midpoint 49 of one arm of the bridge 45. As discussed above in connection with Fig. 1, the length of this transmission line may be such that it will, together with the output circuit of transmitter 48, resonate as a line with substantially equal impedance at both ends; and thus it need not be provided with a blocking circuit such as the coupled section 20 shown in the case of Fig. 1. It will be clear that with the means thus far described, energy to be transmitted may be furnished with substantially uniform magnitude and phase to each of the antenna elements 41 . . . 44 so that radiation of transmitted impulses may be uniform and in one generally forward direction.

In order to obtain directional effects upon switching in the receiver circuits, I propose first to receive energy arriving from the same side as elements 41 and 44 (e. g. from the left) alternately with that arriving from the same side as antenna elements 42 and 43 (e. g. from the right) and then to receive energy from the quadrants of antenna elements 41 and 42 (i. e. from above) alternately with that arriving from the quadrants of elements 43 and 44 (i. e. from below). Thus, it will be seen that I contemplate four different connections of the respective antenna elements to obtain directional reception effects.

In order to condition the antenna structure 40 for reception as just broadly outlined above, I consider it preferable effectively to open up one of the arms of the bridge 45. Let us first consider the case of the first-mentioned of the above alternations, that is, when reception alternates between energy from the side of elements 41 and 44 and energy from the side of elements 42 and 43. Since the corner of bridge 45 to which element 41 is connected is an integral number of wavelengths from corner 50 to which the element 44 is connected, these points may represent the same point electrically. The same may be said in the case of elements 42 and 43 which may be considered in an electrical sense to be connected to the corner 51 of bridge 45. Now, if the arm 52 opposite points 50 and 51 be effectively opened, as by employing a coupled section 120 it will be clear that the receiving antenna structure is in effect the same as that shown in Fig. 1 and represented by dipoles 1 and 2. Thus, all that need be done to obtain alternate directional reception with line 52 effectively open, is alternately to connect the detector or receiver 53 to a point 54 and to a point 55 on the arm of bridge 45 joining points 50 and 51, points 54 and 55 each being equidistant from the transmitter connection 49. As in the case of the circuit of Fig. 1, coupled sections 56 and 57 may be associated with the transmission lines feeding detector 53 from points 54 and 55 so that the analogy of the circuit thus far described to that shown in Fig. 1 is complete. Appropriate keying means for obtaining the above indicated functions will be hereinafter described. It may be pointed out that in the form shown and with the connections just described, reception is alternately effectively to the left and then to the right of the generally forward axis of the transmitted energy pattern. Accordingly, it is clear that with indicating apparatus of the nature shown in Fig. 1, reception may be indicative of the relative azimuth of and distance to detected objects.

As indicated, antenna structure 40 may be employed to perform an additional directional discriminating function. In such case, reception would be first obtained by effectively utilizing antenna elements 41 and 42 together as a unit and then elements 43 and 44 as another unit. To this end, instead of effectively opening up the arm 52 of bridge 45, I propose that the arm 58 be so effectively opened up, as by employing a coupled section 59, tuned to resonate. To perform additional direction discriminating functions with the apparatus connected in this manner, it is considered preferable to provide an additional receiver or detecting apparatus 60 and alternately to connect this receiver to points 61 and 62 on the arm of bridge 45, opposite to arm 58 (which, as indicated above, is effectively open circuited). As in the cases described in Fig. 1, and above, with respect to points 54 and 55, points 61 and 62 are preferably located equidistant from the midpoint of the bridge arm to which they are connected. As in the case of azimuth detection, a pair of coupled sections 63, 64 associated with the lines connecting detector 60 to bridge 45 may be employed alternately to condition each of these lines to pass received energy to detector 60. Thus it appears that bridge 45 may be employed to supply another directional discriminating receiver circuit completely analogous to that shown in Fig. 1. If the circuit described in connection with detector 53 be considered to obtain indications of relative azimuth, then it will be clear that detector 60 may be employed to obtain indications of the relative elevation of detected objects.

The remainder of the circuit of Fig. 2 may be very similar to that shown in Fig. 1. A saw-tooth generator 65 is appropriately timed by a connection to impulse generator 47 and supplies regular sweeping energy to the vertical deflection system 66 of the oscillograph. An appropriately keyed reversing switch 67 serves to connect output energy from detector 53 to the horizontal deflection system 68 of the oscillograph with polarity alternating in cadence with the alternate operation of coupled sections 66 and 67. Another reversing switch 69 associated with the output of detector 60 may be employed to apply such output to the vertical deflection system 66 with a polarity reversing in cadence with the alternate operation of coupled sections 63, 64 as will be clear.

Suitable keying means for controlling and properly synchronizing the above-described coupled sections and reversing switches may be devised in a relatively simple manner. As indicated in connection with the circuit of Fig. 1, the relatively slow alternate operation of the respective receivers need have no particular timed relation to the periodicity of transmitted impulses. Accordingly, keying signals may be generated from separate sources 70 and 71. For reasons that will become apparent from the following description, source 70 preferably provides an alternating current of a frequency twice that supplied by source 71; and, to this end, these sources may be appropriately synchronized as indicated schematically by the connection 73. In order to provide cleanly defined control signals, energy from source 70 may be fed through a limiter amplifier 74, whereby a regular series of square waves of frequency 2F is generated. These square waves may be separated into the trains of complementary square waves of the same frequency 2F, by passage through a double diode 72 to lines 75 and 76 in the manner shown. It is clear that energy in line 75 (as depicted graphically in the curve of Fig. 3a) may represent a control signal for one operation and energy present in line 76 (as depicted graphically in the curve of Fig. 3b) may represent a control signal for an operation succeeding that first-mentioned. However, since four basic alternate signals are required successively to operate coupled sections 56, 57, 63 and 64, additional means must be provided for effectively suppressing every other square wave of the train in line 76 and every other square wave of the other train (in line 76), as will be clear. To this end, energy from source 71 of frequency F is fed to a limiter amplifier 77 to generate a train of square waves of twice the duration of those present in lines 75 or 76. In the form shown, these latter and longer duration square waves are fed to two independent lines 79 and 80 through a double triode device 78, for purposes which will later be clear. Energy supplied from tube 78 may thus be of the form shown in Fig. 3c in both lines 79 and 80.

Now, by combining the energy present in lines 75 and 79 in alternate polarity senses, it will be clear that two discrete and non-concurrent control signals may be obtained. Directly combined, these signals would be of the form shown in Fig. 3f, which form when inverted in the opposite polarity sense will appear as shown in Fig. 3h, as will be clear. It is suggested that appropriate means for obtaining signals of the first of these forms (Fig. 3f) may comprise a branch line 81 including a clipper 83 of known form. Clipper 83 is preferably at least a triode, and in order to obtain the desired control signal as indicated by the shaded areas 110 in Fig. 3f, the bias on the grid electrode thereof may be appropriately set to correspond, say, to the dot-dot-dash line of this figure. As indicated, the curve of Fig. 3h is merely the inverse of that of Fig. 3f. Accordingly, to obtain output signals of the nature indicated by shaded areas in Fig. 3h, energy supplied clipper 83 is also fed to an inverter device 82; whereafter a clipper 82' with appropriate bias, which may correspond in level to the dot-dot-dash line of Fig. 3h, may eliminate all but the shaded areas of Fig. 3h to yield another control signal in line 87.

It will further be clear that two further discrete signals, non-concurrent with each other or with the signals just described, may be developed by combining the outputs of lines 76 and 80 in a manner similar to the way in which lines 76 and 79 were combined. These further signals have been indicated graphically in Figs. 3e and 3g, and it will be observed that when appropriately clipped, two further trains of control signals (indicated again by shaded areas 114, 116 respectively) are supplied to lines 84 and 86. Thus control lines 81, 84, 86 and 87 may each supply a regular series of square wave control signals, none of which will overlap in point of time.

In the manner indicated in the circuit of Fig. 1, each of lines 81, 84, 86 and 87 may be connected to the control circuits for coupled sections 56, 57, 63 and 64 respectively. Since the coupled sections which serve effectively to open arms 52 and 58 of bridge 45 may operate at half the alternating frequency of say coupled sections 56 and 57, appropriate control signals for obtaining this function may be derived from the output of limiter amplifier 77 through a double rectifier device 88 in a manner analogous to that described above in connection with the double diode in the output of limiter amplifier 74. The output of tube 88 into lines 89 and 90 may include a series or train of square-wave impulses in one line in staggered relation to the series present in the other line, each of these series being displaced with respect to the other so as not to overlap in point of time (see the respective curves of Figs. 3c and 3d). For more accurate and reliable operation of the coupled sections alongside arms 52 and 58 of network 45, I prefer that the tuning elements associated therewith be so adjusted as normally (that is, in the absence of a control signal as supplied by lines 89 or 90) to condition these coupled sections for resonance. Thus, upon application of any control signal, these coupled sections may be detuned. Similarly, in the case of coupled sections 56, 57, 63, 64, I prefer to adjust the tuning elements thereof in such manner that, when one of the control signals represented by shaded areas in Figs. 3e, f, g, h is applied thereto, these respective signals are operated to detune coupled sections 56, 57, 63, 64 successively from resonance.

It will be recalled from the discussion of operation of the circuit of Fig. 1 that all receiver circuits must be properly disabled or blocked off during the instant of transmission of impulses by transmitter 48. Accordingly, it is considered preferable to apply appropriate blocking impulses as generated by generator 48' to each of the circuits controlling a coupled section. In order to prevent diversion of control signals from their appropriate channels as above-defined, it is considered preferable that the blocking impulses supplied by generator 48' and appropriately controlling the coupled sections be connected to the control elements thereof through suitable decoupling means. In the cases of the lines supplying these blocking impulses to the coupled sections associated with network 45, such decoupling means may comprise common diodes inserted as shown by schematic blocks 97, 98. Since, as mentioned, the coupled sections associated with network 45 are designed normally to resonate in the absence of an applied control signal, the effect of directly applying blocking impulses from generator 48' to the control elements thereof is positively to detune these coupled sections, whereby network 45 is appropriately conditioned for transmitting impulse wave trains, as will be understood.

A suitable method of decoupling the supply of impulses from generator 48' to lines 81, 84, 86 and 87 may be to provide the discharge devices constituting the clippers 83, 85, 91, 82' with an additional grid or control electrode, whereby the blocking impulses may be translated in effect to each of these lines without passing the control signals present in one line to another of these lines, as will be clear. Since, as specified, coupled sections 56, 57, 63, 64 are designed normally to resonate in the absence of an applied control signal, the effect of applying blocking impulses of appropriate polarity (as obtained by passage through, say, an inverter 92) from generator 48' to the further grids of clippers 83, 85, 91, 82' may be completely to suppress emission within these tubes, and, hence, positively to cut out application of any signal to the control elements of coupled sections 56, 57, 63, 64, whereby these sections may resonate and block the respective receiver lines to which they are coupled.

It will be clear that with the circuit thus far described the deflection systems 68, 66 of the oscillograph may be supplied with potentials in somewhat the following sequence. First, there may be a succession of impulses of relatively large magnitude of one polarity applied to the horizontal deflection system so as to cause a relatively large deflection 99 of the cathode ray to the right of the vertical axis of the oscillograph screen (Fig. 2). Then there may be a series of relatively small magnitude impulses of opposite polarity, due to reversal of polarity switch 67, applied to the same deflection system so as to cause a relatively small deflection 100 of the cathode ray to the left of the vertical axis. Then, a relatively large deflection potential of one polarity may be applied to the vertical deflection system 66 so as to produce a rather large cathode ray deflection 101 above the horizontal axis of indications 99 and 100, and thereafter a relatively small deflecting potential of opposite polarity, due to reversal of polarity switch 69, may be applied to the same deflected system 66 to produce a relatively small downward deflection 102 of the cathode ray. It will be appreciated that such a cycle of deflection potential applications may recur at a sufficiently high frequency so that all the deflections 99, 100, 101 and 102 will appear to be simultaneously applied on the oscillograph due to persistence of vision. The indication described may be interpreted to indicate a reflecting object generally to the right and above the axis of transmitted energy from the fact that deflections 99 and 101 are of approximately the same magnitude and are considerably greater than deflections 100 and 102.

With the system thus far described, a cathode ray will be continuously emitted in the oscillograph so as continuously to make a trace across the screen thereof. It is considered that such a trace, except for the portion thereof which represents any one of deflections 99, 100, 101 and 102, may be objectionable and, hence, a source of confusion should there be more than one reflecting object within range of the apparatus. Accordingly, I consider it preferable to provide means for rendering the oscillograph inoperative to show any indications on the screen thereof during substantially all intervals when no impulses are detected. Such means may comprise a derivation of energy proportional to received and detected impulses as obtained, for example, from detectors 53 and 60, and may be connected to supply a series of substantially square waves of a duration corresponding to the period intervening between detected impulses. The control signal supplied by control circuit 103 may impress appropriate bias upon say a grid 104, controlling emission of the cathode ray. Such a circuit may then be operative substantially completely to extinguish any portion of a cathode ray trace appearing when no impulses are received. In this connection, it may also be desirable to make sure that no deflecting potentials are effectively applied to the oscillograph during the period of transmission of impulse energy. In such case, the blanking control circuit 103 may be additionally supplied with energy proportional to the output of generator 48', thus assuring extinction of the cathode ray during the transmission of impulse energy.

It is to be noted that I have provided a relatively simple device for using one single antenna structure for essentially five distinct functions, namely, for transmission in one generally forward direction and for reception in two alternate senses of each coordinate of a two-coordinate system. Prior systems have been devised for separately using four distinct antenna structures, each for reception in four desired directions. In such a system, precision depends entirely on the directional sensitivity of each of the four independent elements. In accordance with the present invention, the four elements of a single antenna structure, are all used simultaneously for each direction of reception, thus permitting a far higher degree of sensitivity and hence greater accuracy of directional discrimination.

In the above discussions of the manner of connecting transmitter and receiver lines to arms of bridge 45 in Fig. 2 or to the transmission lines connecting dipoles 1, 2 in Fig. 1 it has been indicated that the transmitter should be connected to the midpoint and the receiver lines symmetrically about the midpoint. It will be clear that such a definition was made merely for purposes of clarity and that other arrangements may be devised. Actually, the transmitter connection should be electrically symmetrical with respect to the antenna elements. Thus, any such connection of the transmitter would be appropriate if the energy supplied to all the antenna elements were in phase. In the case of the arrangement in Fig. 2 it would then be necessary that the transmitter be connected to a point on an arm of bridge 45, which point will assure supply of energy of the same phase to each end of that arm. Thus, in the case of an arm one wavelength long, this point would be the midpoint; in the case of an arm two wavelengths long, this point would be either the midpoint or one of the points a half wavelength from an end of the arm; and so on, the connection in each instance being an integer number of half wavelengths from an end of the arm.

On the other hand, it is considered that receiver line connections should be disposed electrically symmetrical about such a point as has just been defined for the case of transmitter line connections. Thus, in the case of a one-wavelength arm of bridge 45, one receiver line should be $+\alpha°$ from the midpoint and the other should be $-\alpha°$ therefrom. In the case of a two-wavelength arm, one receiver line may be connected $+\alpha°$ from the midpoint and the other $-\alpha°$ therefrom; or one receiver line may be connected $+\alpha°$ from a point a half wavelength from one end and the other $-\alpha°$ from that point; or one receiver line may be connected $+\alpha°$ from a point a half wavelength from one end of the arm, and the other line to the arm $-\alpha°$ from a point a half wavelength from the other end of the arm; and so on for various-sized arms.

Although I have described my preferred forms of the invention particularly in connection with tuned coupled sections in accordance with the teachings of my above-identified application, it is clear that the principles of this invention may be adapted to equivalent devices for performing essentially the same functions. For example, instead of alternatively effectively blocking the transmission paths feeding a receiver, the receiver itself may include a switching device such as a multi-vibrator controlled by the keying signal alternately to pass received energy through each of the alternate transmission paths to the receiver. It is also clearly to be understood that the principles of this invention are equally adaptable to other forms of indicating circuit than those shown in Figs. 1 and 2, such as for example, those described in the above-mentioned copending applications of H. Busignies and E. Labin.

It is further to be pointed out that although I have throughout the above remarks and discussion referred to lengths of various transmission lines and arms of network 45 as being an integer number of wavelengths or half-wavelengths, the term integer may be interpreted rigorously to comprise all multiples including zero. Furthermore, it is to be observed that the expression "length" of a transmission line should be interpreted as including effective electrical length. Thus, a line specified as a one wave-length line may be either that length in fact, or one-half wavelength with a transposition, or any lesser length with appropriate phase displacement means to yield a one wave-length line in its ability to take signals of one phase and release them with the same phase, as will be clear.

The last mentioned two alternate examples are given merely by way of illustration, and it is to be understood that many more additions, omissions and modifications may be made fully within the scope of this invention.

What I claim is:

1. A radio impulse system comprising transmitter means, receiver means, an antenna structure for both transmitting and receiving electromagnetic waves, means for alternately providing an effective transmission path between said antenna structure and said transmitter means and between said antenna structure and said receiver means, and means for causing said antenna structure to receive alternately according to two differently-directed radiation patterns.

2. A radio impulse system comprising transmitter means, receiver means, an antenna structure for both transmitting and receiving electromagnetic waves, connecting means between said antenna structure and said transmitter means, connecting means between said antenna structure and said receiver means, means for alternately rendering said first-mentioned and said second-mentioned connecting means ineffective to pass radio frequency energy, and means for causing said antenna structure to receive alternately according to two differently-directed radiation patterns.

3. A radio impulse system comprising transmitter means, receiver means, an antenna structure for both transmitting and receiving electromagnetic waves, connecting means between said antenna structure and said transmitter means, connecting means between said antenna structure and said receiver means, means for alternately rendering said first-mentioned and said second-mentioned connecting means ineffective to pass radio frequency energy, and means for causing said antenna structure to receive alternately according to two differently-directed overlapping radiation patterns.

4. A radio impulse system comprising transmitter means, receiver means, a pair of antennae, a first transmission line connecting said antennae, a second transmission line extending from said transmitter means and connected to said first transmission line at a point so located that said two antennae are energized in like phase by currents from said transmitter means, third and fourth transmission lines extending from said receiver means and connected to points on said first transmission line located one on each side of said first-mentioned point, and means for blocking and unblocking said second, third, and fourth transmission lines to high frequency currents.

5. A radio impulse system for the location of distant objects comprising transmitter means including a source of high frequency carrier waves, receiver means, an antenna structure for both transmitting and receiving, an impulse generator for modulating said source of high frequency carrier waves, a transmission path extending from said transmitter means to said antenna structure, two further transmission paths extending between said receiver means and said antenna structure, control means electrically coupled with said second-mentioned transmission paths for blocking them to said high-frequency carrier waves for the period of each impulse and for unblocking them during the intervals between impulses, and keying means connected with said control means for causing the system to receive alternately according to two differently-directed radiation patterns.

6. A radio impulse system for the location of distant objects comprising transmitter means including a source of high frequency carrier waves, receiver means, a pair of antenna elements, a first transmission line connecting said antenna elements, a second transmission line extending from said transmitter means and connected to said first transmission line at a point so located that said antenna elements are energized in like phase by currents from said transmitter means, said second transmission line being of an effective electrical length to resonate at the frequency of said carrier, third and fourth transmission lines extending from said receiver means and connected to points on said first transmission line located on each side of said first-mentioned point, a source of impulses for modulating said source of high frequency carrier waves, control means electrically coupled with each of said third and fourth transmission lines for blocking and unblocking them to said high-frequency carrier waves, a connection from said source of impulses to each of said control means for causing said third and fourth transmission lines to be blocked to said high frequency carrier waves for the duration of each said impulse, and for causing said third and fourth transmission lines to be unblocked to waves of the frequency of said carrier waves during intervals between impulses, a keying device, and a connection from said keying device to each of said control means connected with said third and fourth transmission lines, for causing said third and fourth transmission lines to be alternately blocked to waves of the frequency of said carrier waves for predetermined time intervals.

7. A radio impulse system for the location of distant objects comprising transmitter means including a source of high-frequency carrier waves, receiver means, a pair of antenna elements, a first transmission line connecting said antenna elements, a second transmission line extending from said transmitter means and connected to said first transmission line at a point so located that said antenna elements are energized in like phase by currents from said transmitter means, third and fourth transmission lines extending from said receiver means and connected to points on said first transmission line located one on each side of said first-mentioned point, a source of impulses for modulating said source of high frequency carrier waves, control means electrically coupled with each of said third and fourth transmission lines for blocking and unblocking them to said high frequency carrier waves, a connection from said source of impulses to each of said control means for causing said third and fourth transmission lines to be blocked to said high frequency carrier waves for the period of each impulse and for causing said third and fourth transmission lines to be unblocked to waves of the frequency of said carrier waves during the intervals between impulses, a keying device, and a connection from said keying device to each of said control means connected with said third and fourth transmission lines for causing said third and fourth transmission lines to be alternately blocked to waves of the frequency of said carrier waves for predetermined time intervals.

8. A radio impulse system according to claim 7, wherein each said control means for blocking and unblocking the respective transmission lines comprises a short section of transmission line coupled to each said transmission line, and a control circuit for controlling the resonant and non-resonant condition of said short section.

9. A radio impulse system according to claim 7, in which said keying device comprises a source of waves of square wave-form having a periodicity less than the periodicity of said source of impulses.

10. A radio impulse system according to claim 7, further comprising an oscillograph and a connection from the output circuit of said receiver means to deflecting elements of said oscillograph.

11. A radio impulse system according to claim 7, further comprising an oscillograph, connection leads from the output circuit of said receiver means extending to deflecting elements of said oscillograph and means for reversing the polarity of said connection leads with respect to said deflecting elements synchronously with the alternate blocking of said third and fourth transmission lines.

12. A radio impulse system according to claim 7, further comprising an oscillograph, a connection from the output circuit of said receiver means to one pair of deflecting elements of said oscillograph and means for applying a sweep potential to the other pair of deflecting elements of said oscillograph.

13. A radio impulse system according to claim 7, further comprising an oscillograph, a connection from the output circuit of said receiver means to one pair of deflecting elements of said oscillograph, a generator of saw-tooth waves excited from said source of impulses, and means for applying said saw-tooth waves to the other pair of deflecting elements of said oscillograph.

14. A radio impulse system comprising impulse energy transmitter means, receiver means, an antenna structure for both transmitting and receiving electromagnetic wave impulses, means for alternately providing an effective transmission path between said antenna structure and said transmitter means and between said antenna structure and said receiver means, means for causing said antenna structure to receive alternately according to two differently-directed radiation patterns, and means connected with said receiver means for comparing the signal intensities received according to said two differently-directed radiation patterns.

15. A radio impulse system for the location of distant objects and operating at a carrier frequency, said system comprising four antenna elements, a transmission line network including four arms each of which is an integral number of wave lengths of said carrier, transmission line means connecting each of said elements to a corner of said network, transmitter means including means for modulating the same with a series of relatively short impulses, means connecting said transmitter means to a point on an arm of said network an integral number of half wavelengths from the respective ends of said arm, receiver means responsive to said carrier and including means for detecting received reflections of impulse energy transmitted by said transmitter means, means connecting said receiver means to an arm of said network, said last mentioned connecting means including two transmission paths connected electrically symmetrically about a point on said last mentioned arm an integer number of half wavelengths from the respective ends of said last mentioned arm, means for blocking said two transmission paths during the instants of transmission of impulse energy, means effectively blocking the arm of said network opposite said last mentioned arm during intervals between transmission of impulse energy, and means for alternately blocking and unblocking said two transmission paths while said opposite arm is effectively blocked.

16. A radio impulse system according to claim 15, further comprising additional receiver means responsive to said carrier and including means for detecting received reflections of impulse energy transmitted by said transmitter means, means connecting said additional receiver means to an arm of said network adjacent said last mentioned arm and including two further transmission paths connected electrically symmetrically about a point on said last mentioned adjacent arm an integer number of half wavelengths from the respective ends of said last mentioned adjacent arm, means for blocking said two further transmission paths during the instants of transmission of impulse energy, means effectively blocking the arm of said network opposite said arm to which said further transmission paths are connected during intervals between transmission of impulse energy, and means for alternately blocking and unblocking said two further transmission paths while said last mentioned opposite arm is effectively blocked, said two last defined means being operative alternately with operation of said first mentioned alternate blocking means.

ROSS B. HOFFMAN.

REFERENCES CITED

The following references are of record in the file of this patent:

UNITED STATES PATENTS

| Number | Name | Date |
|---|---|---|
| 2,176,469 | Moueix | Oct. 17, 1939 |
| 2,189,549 | Hershberger | Feb. 6, 1940 |
| 2,205,560 | Herzog | June 25, 1940 |
| 2,231,929 | Lyman | Feb. 18, 1941 |